June 23, 1959 S. E. SCHROEDER 2,891,498
HYDRAULIC CONTROL MECHANISM FOR MOTOR BOATS AND OTHER USES
Filed Aug. 6, 1954 4 Sheets-Sheet 1
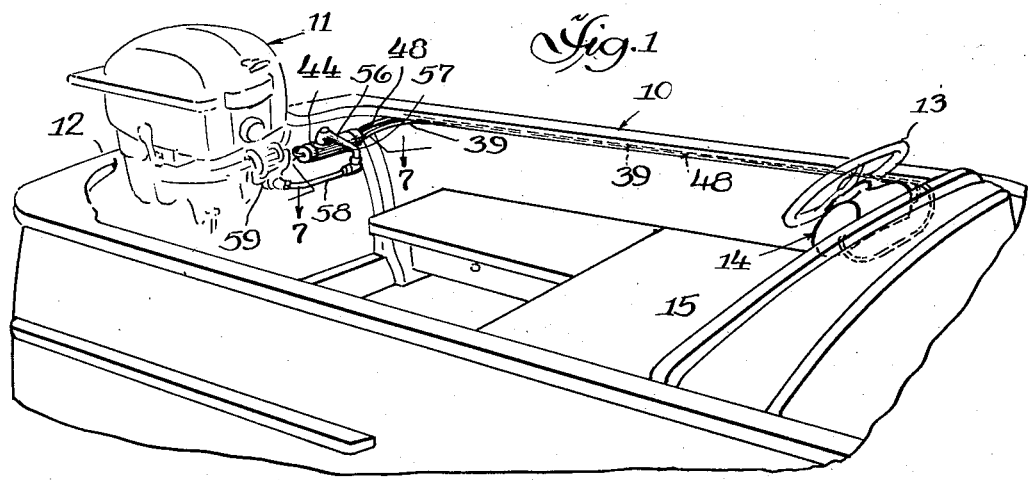
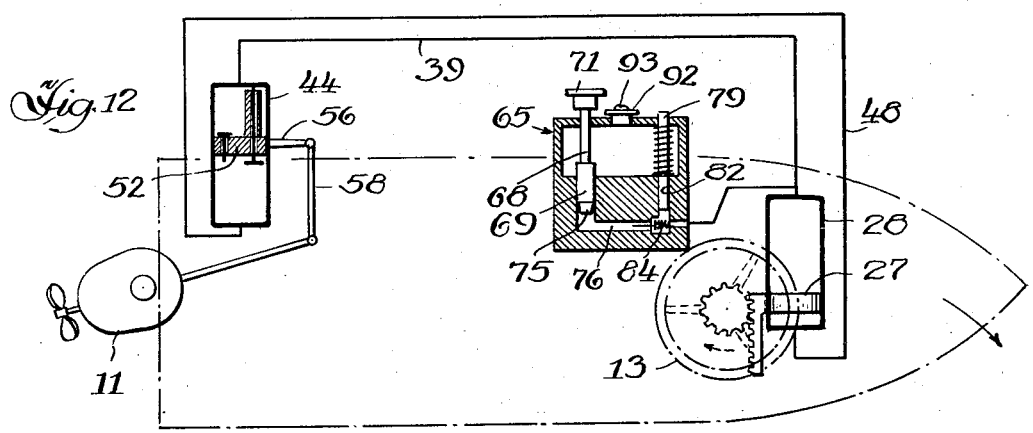
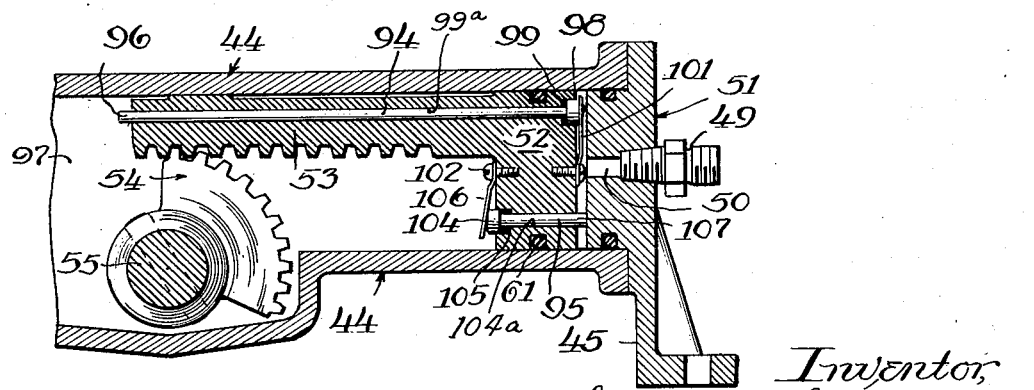
Inventor,
Simon E. Schroeder,

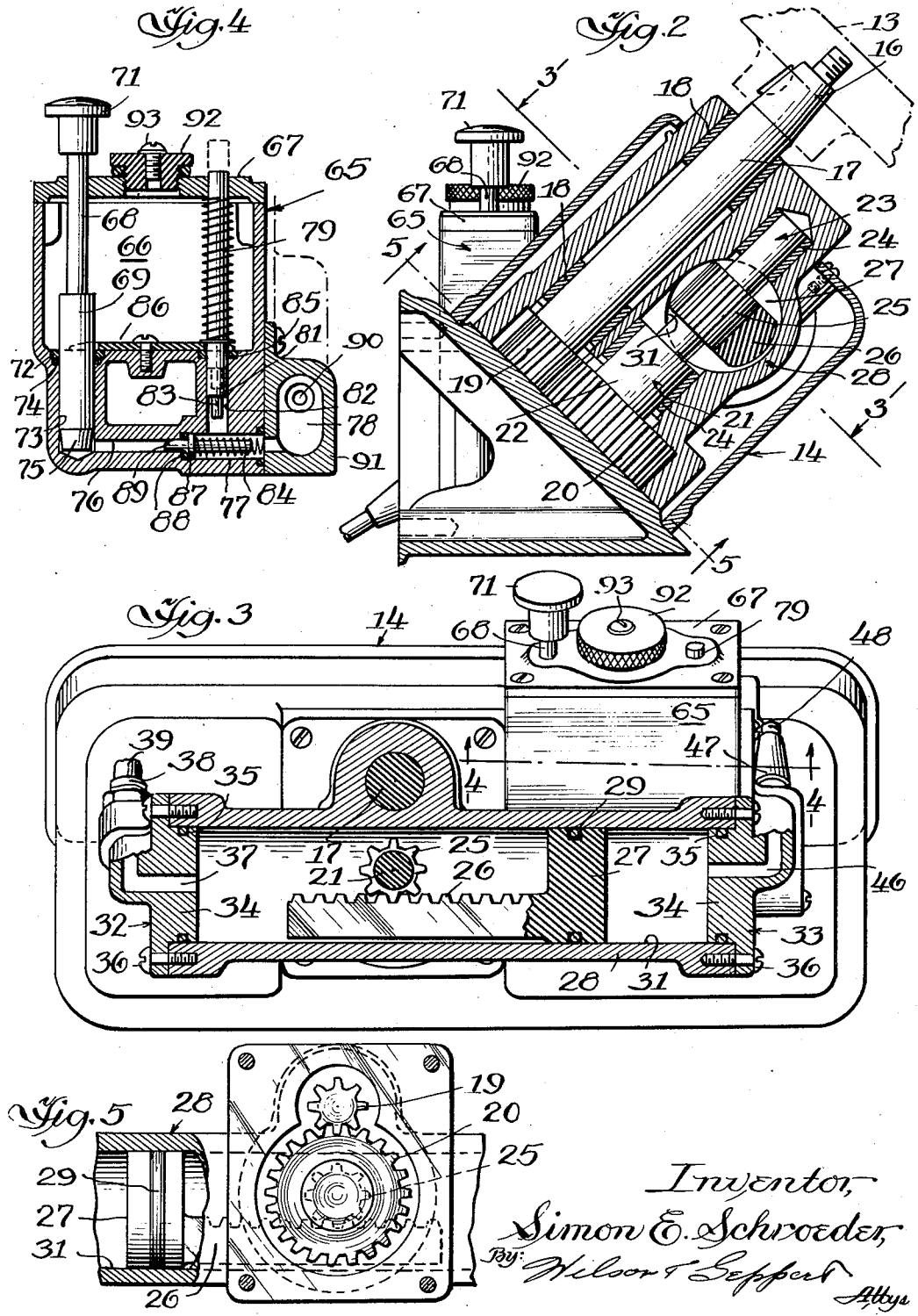

June 23, 1959  S. E. SCHROEDER  2,891,498
HYDRAULIC CONTROL MECHANISM FOR MOTOR BOATS AND OTHER USES
Filed Aug. 6, 1954  4 Sheets-Sheet 3
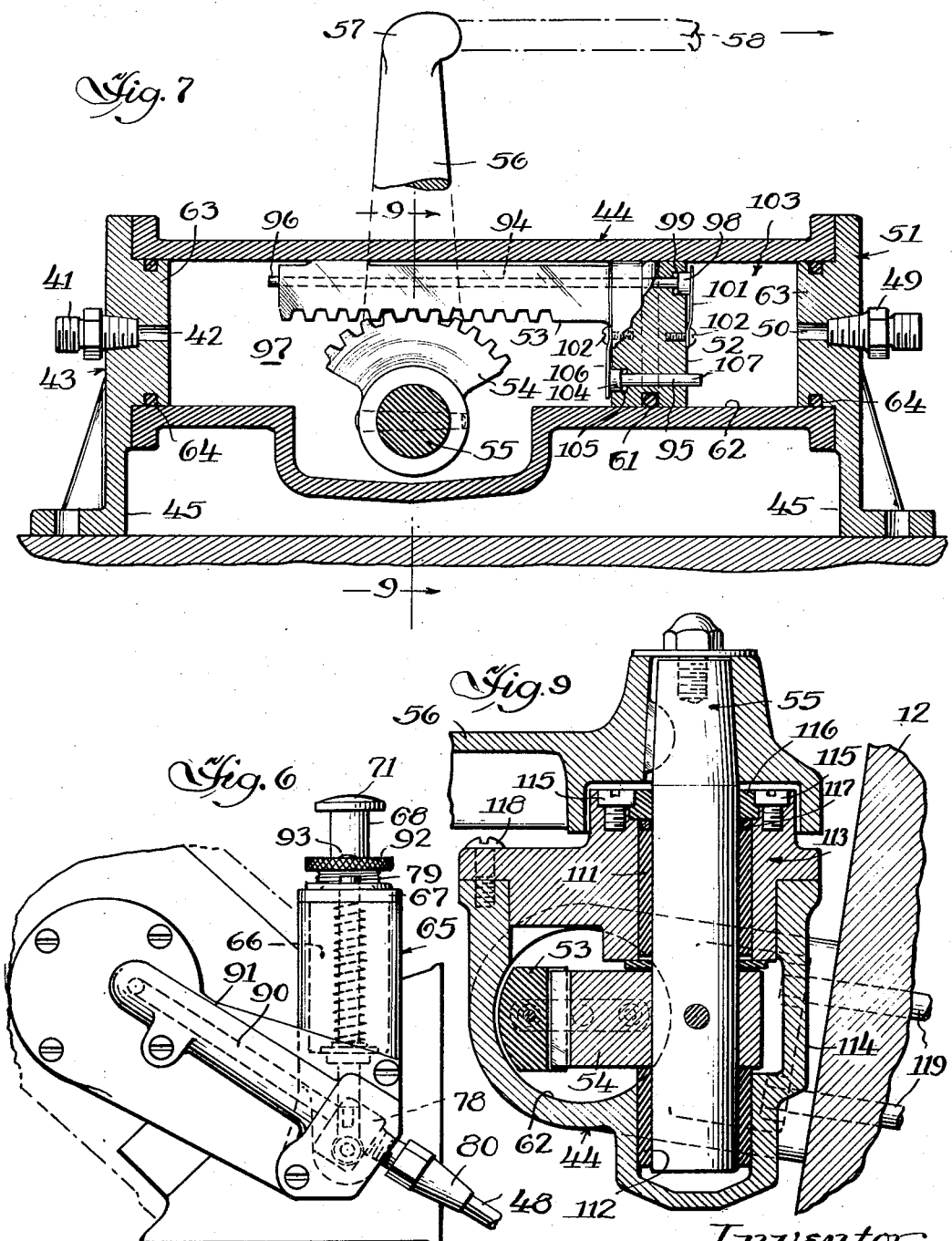
Inventor,
Simon E. Schroeder,
By: Wilson T. Geppert
Attys.

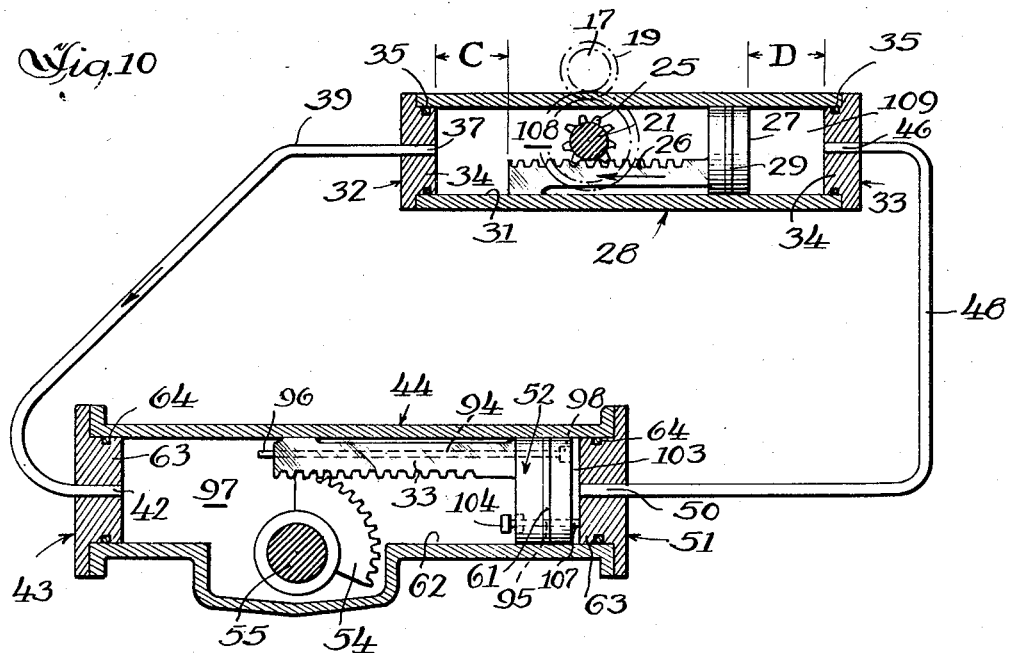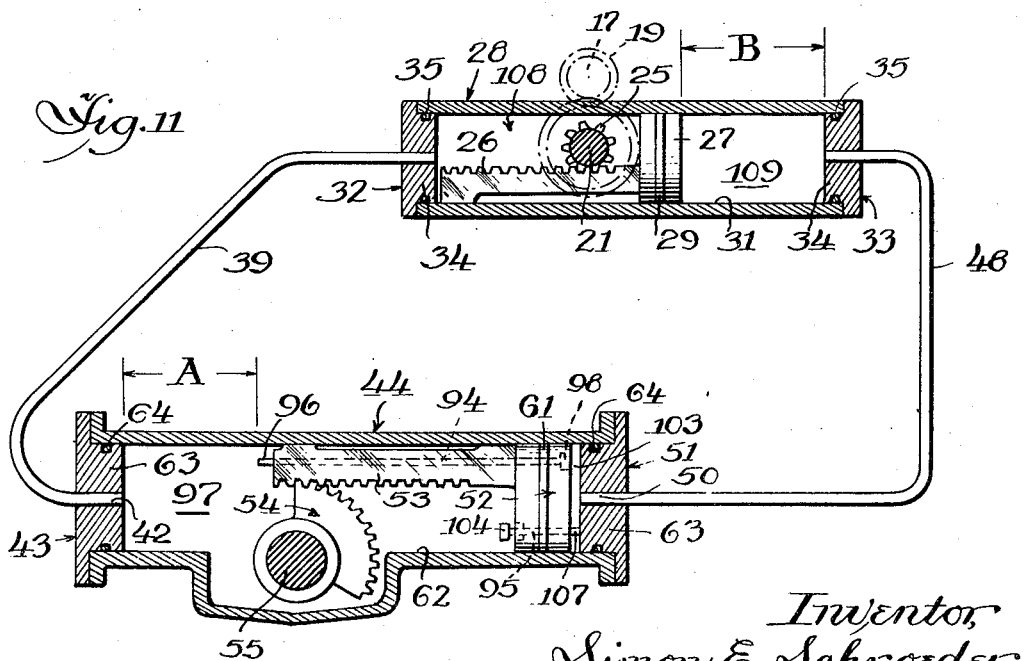

United States Patent Office 2,891,498
Patented June 23, 1959

2,891,498

HYDRAULIC CONTROL MECHANISM FOR MOTOR BOATS AND OTHER USES

Simon E. Schroeder, Oshkosh, Wis., assignor, by mesne assignments, to Fox River Manufacturing Company, Oshkosh, Wis., a corporation of Wisconsin Application August 6, 1954, Serial No. 448,190

3 Claims. (Cl. 114—150)

The present invention relates to novel mechanism for the remote control and steering of an inboard or outboard motor boat and the remote control of other shifting and operating mechanisms.

Among the objects of the present invention is the provision of a novel hydraulically-operated means and mechanism for the remote steering of a motor boat of either the outboard or inboard type.

Another object of the present invention is the provision of a novel self-balancing hydraulic system for the remote control and steering of a motor boat of the outboard or inboard type, whereby the operator is assured of positive control at all operating speeds.

Another and very important object of the present invention is the provision in a hydraulic control mechanism, of a novel means and manner of automatically balancing or equalizing a pair of reciprocating pistons whereby to automatically balance these pistons each time the operating wheel or control lever is turned to the limit of its turning movement in either direction.

A further object of the present invention is the provision of a novel automatically-balanced hydraulic system for the remote steering and control of a motor boat of either the inboard or outboard type, and in which hydraulic power is employed to effect steering from the dash panel giving positive rudder or turning control without back-lash, instant response under any and all conditions of operation, optimum quietness in operation and dual control at the steering position remote from the motor as well as direct operation from the tiller handle of an outboard motor. Another important advantage of the present hydraulic steering control is that when the wheel is set for a predetermined course of travel, the operator is assured that the course set will be maintained.

The present invention further comprehends the provision of a novel hydraulically-actuated steering mechanism that permits the operator to steer an outboard motor boat from a position remote from the motor without interfering with the direct control from the tiller handle at the rear or stern of the boat. By the present construction, all tiller ropes with which prior remote controls have been equipped are completely eliminated.

A further and important object of the present invention is the provision of a novel hydraulic steering unit for inboard or outboard motor boats, including a cylinder mounted in the boat at a position remote from the motor and a cylinder mounted adjacent the motor, with each cylinder containing a reciprocating piston, the piston in the forward cylinder being actuated by steering mechanism such as a steering wheel whereby movement of this wheel in one direction moves the piston in that direction and forces hydraulic fluid from one end of the cylinder into the other cylinder for actuating the piston of the latter connected to means for steering the boat.

Further objects are to provide a construction of maximum simplicity, efficiency, economy and ease of assembly and operation, and such further objects, advantages and capabilities as will later more fully appear and are inherently possessed thereby.

In the drawings:

Figure 1 is a fragmentary perspective view of an outboard motor boat in which the motor is equipped with the novel hydraulic steering mechanism.

Fig. 2 is a view in vertical cross section through the forward cylinder and associated mechanism of the steering unit mounted on the front face of the dash panel.

Fig. 3 is a cross sectional view taken in a plane on substantially the line 3—3 of Fig. 2 and viewed in the direction of the arrows.

Fig. 4 is a view in vertical cross section taken on approximately the line 4—4 of Fig. 3 and viewed in the direction of the arrows.

Fig. 5 is a fragmentary cross sectional view taken on approximately the line 5—5 of Fig. 2 and viewed in the direction of the arrows.

Fig. 6 is a fragmentary view in end elevation of the right-hand end of Fig. 3 and showing the end of the pump assembly.

Fig. 7 is an enlarged view in vertical cross section taken longitudinally through the cylinder at the rear of the boat and mounted adjacent the motor of Fig. 1, the view being taken on approximately the line 7—7 of Fig. 1.

Fig. 8 is a fragmentary view of the mechanism of Fig. 7, but showing the piston in its extreme position at the right-hand end of the rear cylinder.

Fig. 9 is a fragmentary view in vertical cross section taken on the line 9—9 of Fig. 7 and viewed in the direction of the arrows.

Fig. 10 is a view showing diagrammatically the manner of connecting the front and rear cylinders and the means and manner of balancing or equalizing the hydraulic fluid in the cylinders at the opposite sides of the pistons.

Fig. 11 is a view similar to Fig. 10 but showing the pistons in the front and rear cylinder in balance.

Fig. 12 is a diagrammatic view of the complete assembly or attachment.

Referring to the disclosure in the drawings and more particularly to the novel selected embodiment shown therein to illustrate the present invention, the present novel hydraulic steering mechanism is shown applied to an outboard motor boat 10 having an outboard motor 11 mounted on the transom 12 at the rear of the boat by any suitable clamping bracket. Although the disclosure is that of an outboard motor boat, it is to be understood that the present invention is equally applicable to an inboard motor for controlling the steering of the boat by means of its rudder.

Steering is effected through a steering wheel 13 through the present novel hydraulic system which includes a housing 14 adapted to be mounted at the front of a dash panel 15 (Figs. 1 and 2) or at any convenient location in the boat remote from the motor 11, whereby the steering of the outboard motor boat has dual control; that is, through turning of the steering wheel 13 or by manipulating the tiller handle with which such motors are equipped.

The steering wheel 13 is mounted upon the upper end 16 of a rotatable steering post or shaft 17 (Fig. 2) journalled in spaced bearings 18 in the bore of the housing 14, whereby rotation of the wheel in turn rotates this post or shaft. Pinned or keyed to the lower end of this steering post or shaft 17 is a pinion or gear 19 in mesh with and rotating a larger gear or pinion 20 pinned or keyed to a stub shaft 21. This stub shaft has stepped portions 22 and 23 journalled in spaced bearings 24 and intermediate its ends the stub shaft has keyed or pinned thereto a gear 25 in meshing engagement with the teeth of a rack bar 26 carrying at one end and actuating a piston 27 (Figs. 2, 3 and 5) conformably received and slidably mounted in a cylinder 28 in the housing 14.

The piston 27 is provided with an annular groove containing an O-ring 29 having sealing and wiping contact with the inner wall 31 of the cylinder 28. The hydraulic fluid, such as oil, used as the propellant or power transmitting medium, is contained in the cylinder at either side of the piston 27. The cylinder 28 is closed by end plates 32 and 33 each having a reduced portion 34 fitting conformably within the opposite ends of the cylinder 28 and each having an O-ring 35 carried within an annular groove providing sealing contact with the inner wall 31 of the cylinder. Bolts or other securing means 36 anchor the end plates 32 and 33 in the ends of the cylinder.

The end plate 32 is provided with a passage 37 communicating with a coupling 38 connected to a conduit 39 (Figs. 1, 9, 10 and 11) which in turn is attached to a coupling 41 (Fig. 7) communicating with a passage 42 in an end wall or plate 43 of a second cylinder 44 mounted at the rear of the boat 10 adjacent the motor 11 by means of a bracket or support 45. The end plate 33 (Fig. 3) is provided with a passage 46 communicating with a coupling 47 and one end of a conduit 48 connected at its other end to a coupling 49 (Fig. 7) communicating with a passage 50 in an end wall or plate 51 of the cylinder 44.

In the cylinder 44 there is provided a piston 52 adapted to be reciprocated by the hydraulic fluid entering one or the other end of the cylinder 44 through the passage 42 at one end of the cylinder or through the passage 50 in the other end of this cylinder. Like the piston 27, the piston 52 is carried by a rack bar 53 the teeth of which are maintained in meshing engagement with a gear sector or segment 54 pinned or keyed to a substantially vertically arranged stub shaft 55 projecting into the cylinder 44 and carrying at its outer end a fixed arm 56 adapted to be rotated or oscillated through an arc about the vertical axis of the stub shaft 55.

The arm 56 at its outer or forward end is provided with a depending projection 57 (Fig. 1) connected to one end of a rod or link 58, the other end of which rod or link is attached to a bracket 59 having spaced bifurcations affixed to the bracket rigidly connected to the motor 11. Thus as the gear sector or segment 54 is oscillated or moved in either direction by reciprocation of the rack bar 53 through the force of the hydraulic fluid entering the passage 42 or 50 from the front cylinder under control of the steering wheel, the arm 56 and its rod or link 58 move the motor in the proper or intended direction for steering the motor boat 10.

Like the piston 27, the piston 52 (Fig. 7) is provided with an annular or peripheral groove receiving an O-ring 61 for sealing and wiping contact with the inner wall 62 of the cylinder 44, and the end plates 43 and 51 are each provided with a reduced portion 63 fitting conformably in the opposite ends of the cylinder 44 and each end wall or plate is sealed by an O-ring 64 carried in a peripheral or annular groove in the reduced portions 63. Each end wall or plate 43 and 51 is attached or anchored to the opposite ends of the cylinder 44 by suitable securing means.

An oil or hydraulic pump (Figs. 3, 4 and 6) is provided in a casing 65 carried at one end of the housing 14 to supply hydraulic fluid to the system. It comprises a fluid chamber or reservoir 66 closed at its upper end by a detachable cover 67 through which projects the reduced stem 68 of a pump piston or plunger 69. The stem 68 extends through an opening in the cover 67 to the exterior of the casing 65 and is thereat provided with a knob 71 adapted to be grasped and manually actuated to raise and lower the pump piston or plunger 69, the lower end of which projects through a collar or bushing 72 and is conformably received in a pump barrel or cylinder 73. An O-ring 74 seals about the piston 69.

The lower end of the piston 69 is reduced or tapered at 75 and the lower end of the pump barrel or cylinder 73 communicates with a laterally extending passage 76 for discharge of the oil or hydraulic fluid entering the pump barrel or cylinder 73 from the reservoir 66, through a larger bore or passage 77 into a sump 78 and from this sump into one end of the cylinders 28 and 44 for replenishing or supplying additional hydraulic fluid to the system.

An indicator in the form of a spring-biased rod or plunger 79 mounted within and projecting through the reservoir 66 has its lower end 81 conformably received in vertical bore 82 communicating with the bore or passage 77, and at its lower end this rod or plunger is provided with a reduction 83 extending to adjacent the bore or passage 77 in which is mounted a spring-biased check valve 84.

Intermediate its ends the rod or plunger 79 projects through a collar or bushing 85 and its upper end projects through the cover 67 of the pump casing 65. A detachable plate 86 holds the collars or bushings 72 and 85 in recesses provided therefor in the casing 65. The check valve 84 has a head or seat 87 spring-biased toward closed position against a sealing ring 88, with the reduced end 89 of the head received and guided in the passage 76.

In order to replenish the supply of oil or hydraulic fluid in the system from the reservoir 66, this is readily accomplished by manipulating the pump in the casing 65. Raising and lowering the pump piston or plunger 69 by actuating its knob 71, causes oil to flow from the reservoir 66 into the pump barrel 73, through the passage 76 and past the check valve 84 in the bore 77, the encompassing coil spring of which is compressed by the pressure of the entering hydraulic fluid. The entering hydraulic fluid flows into the sump 78 and from this sump (Fig. 6) through a passage 90 in an end plate 91 into the passage 46 (Fig. 3) in the end plate 33 at one end of the front cylinder 28. Simultaneously, hydraulic fluid from the sump 78 flows through the coupling 80 into the conduit 48 and from it flows into one end of the rear cylinder 44. When a sufficient quantity of hydraulic fluid has been supplied to replenish the supply in the cylinder 28, the indicator 79 will rise to the dotted line position in Fig. 4 which apprises the operator that sufficient hydraulic fluid has been added to the system whereupon operation of the pump is discontinued. A fill opening closed by a threaded plug or closure 92 permits filling of the reservoir 66. This plug or closure is provided with an air bleed at 93.

When the system is replenished with oil or hydraulic fluid by actuation of the pump, or if there is any leakage in the lines, the pistons 27 and 52 of the system may be thrown out of balance due to an excess of hydraulic fluid at one side of the system. To compensate for such unbalance, the present invention comprehends a novel means and manner of automatically equalizing and balancing the pistons in the system. This is diagrammatically illustrated in Figs. 10 and 11 in which Fig. 10 shows the position of pistons 27 and 52 when the system is unbalanced and Fig. 11 shows the position or location of the pistons when the system is in balance.

The novel means and manner of balancing the pistons 27 and 52 is shown embodied in the piston 52 in the rear cylinder 44 and comprises a pair of longitudinally extending valve stems or rods 94 and 95, the former being conformably but slidably received in and projecting longitudinally through a passage or bore in the piston 52 and its rack bar 53 with end 96 of the valve stem 94 projecting beyond the free end of the rack bar 53 (left-hand end as viewed in Figs. 7, 10 and 11) into the space or chamber 97 of the cylinder 44. The other end of the valve rod or stem 94 is provided with an enlargement or head 98 providing a valve adapted to be moved into sealing contact with an O-ring or sealing washer 99 in a port or recess 99a conformably receiving the valve head.

A leaf spring 101 anchored at one end to the piston 52 by a bolt, screw or attaching means 102, has its free end engaging and spring-biasing the valve head 98 and its valve stem or rod 94 to closed, sealed position and retaining the valve closed until the other end 96 engages the inner face of the end wall or cylinder head 43 at the end of the stroke of the piston 52. When the end 96 of the valve stem or rod 94 abuts the end plate 43, the valve rod or stem is moved bodily to the right (Figs. 7, 10 and 11) whereby the valve 98 opens its port or recess and permits any excess hydraulic fluid to flow from the chamber or space 97 at one side of the piston 52, into the chamber or space 103 of the cylinder 44 at the other side of the piston 52, whereby the pistons 52 and 27 are balanced in the system.

This automatic balancing to compensate for leakage or replenishing of the hydraulic fluid, such as oil supplied in one line of the system, occurs each time the steering wheel 13 is moved to the end of its stroke or turning effort, for the valve stem 95 functions in a manner similar to the valve stem 94 when the piston 52 is moved to the right-hand end of its stroke as shown in Figs. 7, 8, 10 and 11. Like the valve stem 94, the valve stem 95 has a valve portion in the form of a head or enlargement 104 spring-biased into sealing engagement with an O-ring or sealing washer 105 by the free end of a flat or leaf spring 106 anchored at one end to the piston 52 by a bolt, screw or other attaching means 102. This valve stem 95 is free to slide in a transverse bore or opening 104a in the piston 52 and has a projecting end 107 adapted to abut the inner face of the end wall or plate 51 when the piston is moved to approximately the limit of its movement to the right as disclosed in Figs. 8, 10 and 11.

Fig. 10 shows the piston 52 moved to the limit of its movement to the right while the piston 27 has not been moved to the limit of its movement to the left by an amount designated by the distance C. Thus the pistons 27 and 52 are out of balance but by continuing the turning of the steering wheel 13 and its shaft or steering post 17 an amount sufficient to cause the rack 26 and its piston 27 to move through the distance C to exhaust the entrapped hydraulic fluid from the space or chamber 108, while the piston 52 remains stationary in the position shown in Figs. 8 and 10 with its valve 104 open, the pistons are balanced. When the pistons 52 and 27 are in this unbalanced relation and the steering wheel turned to the limit of its movement in one direction, hydraulic fluid from the space 108 flows through the conduit 39 into the space or chamber 97, and from the space 97 by-passes the valve stem 95 through the piston 52 into the conduit 48 and into the space or chamber 109 of the cylinder 28.

Fig. 11 shows the pistons 27 and 52 balanced with the piston 27 and its rack bar 26 in the cylinder 28 moved to the limit of their movement to the left, and the piston 52 and its rack bar 53 in the cylinder 44 moved to the limit of their movement to the right, whereby when the steering wheel 13 is moved to the limit of its movement in either direction of turning, the valve 98 or the valve 104 is opened to by-pass hydraulic fluid and thus automatically compensate for any leakage in the system, or to balance the system after each operation of the pump to replenish hydraulic fluid in the system but which supplies the hydraulic fluid to but one side of each piston. As shown in Fig. 11, the piston 27 and the rack bar 26 in the cylinder 28 when moved to the right move the distance B to reach the end of their stroke, while the piston 52 and its rack bar 53 in the rear cylinder 44 move the distance A to the left to reach the end of their stroke.

As shown more clearly in Figs. 7 and 9, the stub shaft 55 in the cylinder 44 is journalled in spaced bearings or bushings 111 and 112, the bearing or bushing 111 being pressed into a head or cover 113 secured to the body or block 114 of the cylinder 44 by bolts or anchoring means 115 and enclosed at one end by a collar 116, an O-ring or sealing ring 117 being disposed between the collar 116 and the bearing or bushing 111. Bolts or other securing means 118 retain the cover 113 in anchored position. The bearing or bushing 112 is press-fitted into the body or block 114 which is anchored by bolts or other securing means 119 to the transom 12 or other convenient place on the boat 10.

Although the present invention is shown installed in a motor boat of the outboard type, the novel invention is equally adapted for use on motor boats of the inboard type. When installed on a boat of the inboard type, the hydraulic cylinder 44 is mounted in proximity to the rudder and the arm 56 from this cylinder is connected to the rudder to assure effective and positive rudder control at all speeds.

When the present invention is mounted in an outboard motor boat in the manner shown, the operator has dual control (1) at the steering wheel and (2) at the tiller handle with which such outboard motors are equipped.

Although the present invention has been shown in detail as applied to a steering control for motors, it is to be understood that the invention is not limited thereto. It is equally applicable for operating mechanical shifting mechanisms from a remote station. It has also been found admirably adapted for the remote control of variable speed motors, for the remote control and operation of hydraulic valves, such as employed on earth-moving equipment, and in fact wherever remote control of operating mechanism is found desirable or necessary.

Having thus disclosed the invention, I claim:

1. Hydraulic steering mechanism for the control of a motor boat having a motor at the rear of the boat and steering means on said motor for steering from the rear of the boat, a hydraulic system for actuating said steering means from a position forwardly in the boat and remote from said motor, said hydraulic unit consisting of a pair of hydraulic cylinders each having a reciprocating rack bar and a piston at one end only of said rack bar, said cylinders being separated with one positioned at the rear of the boat where its rack bar and piston actuate said steering means on the motor and the second cylinder being remote from and forwardly of said motor, said forward cylinder having a steering control including a steering shaft, a steering wheel for rotating said shaft and gearing for reciprocating the rack bar and piston of said forward cylinder upon rotation of said steering wheel and shaft, conduits connecting the opposite ends of the cylinders for transmitting hydraulic fluid from one side of the piston of the front cylinder to one side of the piston of the rear cylinder, and from the other side of the rear piston to the other side of the front piston whereby turning the steering wheel in one direction moves the piston in the front cylinder which forces the hydraulic fluid from one end of the front cylinder into a connected end of the rear cylinder and thereby moves the piston of the rear cylinder which forces the hydraulic fluid ahead of it from the other side of this piston into the other end of the front cylinder, and turning of the steering wheel in the other direction moves the piston in the front cylinder which forces the hydraulic fluid from the other end of the front cylinder into the connected other end of the rear cylinder to move the piston of the rear cylinder in the opposite direction and cause this piston to force the hydraulic fluid ahead of it into the connected end of the front cylinder, and means for transmitting movement of the piston of the rear cylinder to the steering means on the motor for steering the boat, said last mentioned means having a gear segment in mesh with the rack bar in the rear cylinder and oscillated thereby for actuating the steering means on the motor.

2. Hydraulic steering mechanism as set forth in claim 1, including means for automatically balancing the pistons each time the steering wheel is turned to the limit of its turning movement in either direction.

3. Hyraulic steering mechanism as set forth in claim 1, including valve means carried by the piston in the rear cylinder for automatically balancing the pistons in both cylinders each time the steering wheel is turned to the limit of its turning movement in either direction, said valve means including spaced ports in said piston carrying said valve means, a valve for each port but with these valves disposed at the opposite sides of said piston and with each valve having a valve stem projecting through its port with its end adapted to contact an adjacent end of the cylinder to open its valve and by-pass hydraulic fluid through the open port.

References Cited in the file of this patent

UNITED STATES PATENTS

| | | |
|---|---|---|
| 2,175,800 | Hodgman | Oct. 10, 1939 |
| 2,261,444 | Neubert | Nov. 4, 1941 |
| 2,544,134 | Clark | Mar. 6, 1951 |
| 2,585,389 | Kehrl | Feb. 12, 1952 |
| 2,608,060 | Smith | Aug. 26, 1952 |
| 2,657,535 | Levy | Nov. 3, 1953 |
| 2,657,536 | Levy | Nov. 3, 1953 |
| 2,717,652 | Nichols | Sept. 13, 1955 |